(12) United States Patent
Wachter et al.

(10) Patent No.: US 6,749,232 B2
(45) Date of Patent: Jun. 15, 2004

(54) PIPE CLAMP, IN PARTICULAR, PIPE COUPLING

(75) Inventors: Gerhard Wachter, Büdingen (DE); Wolfgang Barbett, Rhede (DE); Markus Krämer, Mainhausen (DE); Rainer Heise, Siemerode (DE); Manfred Krüger, Büdingen (DE)

(73) Assignee: Rasmussen GmbH, Maintal (DE)

( * ) Notice: Subject to any disclaimer, the term of this patent is extended or adjusted under 35 U.S.C. 154(b) by 11 days.

(21) Appl. No.: 10/142,375

(22) Filed: May 9, 2002

(65) Prior Publication Data

US 2002/0171244 A1 Nov. 21, 2002

(30) Foreign Application Priority Data

May 17, 2001 (DE) .......................................... 101 23 924

(51) Int. Cl.$^7$ ................................................ F16L 21/00
(52) U.S. Cl. ...................................... 285/104; 285/419
(58) Field of Search ........................... 285/373, 104, 285/419, 253

(56) References Cited

U.S. PATENT DOCUMENTS

| | | | | |
|---|---|---|---|---|
| 1,930,194 A | * | 10/1933 | Dillon | 285/104 |
| 2,956,820 A | * | 10/1960 | Cenzo | 285/373 |
| 3,116,078 A | * | 12/1963 | Scherer | 285/104 |
| 3,877,733 A | * | 4/1975 | Straub | 285/373 |
| 4,629,217 A | * | 12/1986 | Straub | 285/373 |
| 4,729,582 A | * | 3/1988 | Zeidler | 285/104 |
| 4,842,306 A | | 6/1989 | Zeidler et al. | |
| 4,898,407 A | * | 2/1990 | Zeidler | 285/373 |

FOREIGN PATENT DOCUMENTS

| | | |
|---|---|---|
| DE | 3632127 | 3/1988 |
| DE | 3710852 | 3/1988 |
| DE | 195 14 940 C1 | 10/1996 |
| DE | 199 01 663 A1 | 7/2000 |
| EP | 0756120 | 1/1997 |
| EP | 0940618 | 9/1999 |
| EP | 1245889 | 10/2002 |

* cited by examiner

*Primary Examiner*—David Bochna
(74) *Attorney, Agent, or Firm*—Friedrich Kueffner

(57) ABSTRACT

A pipe clamp has a tightenable clamp body and at least one spike strip arranged radially inwardly within the clamp body and slanted toward the axial center of the clamp body. The spike strip and a radially inner side of the clamp body delimit an acute angle therebetween. The spike strip has a first longitudinal edge provided with teeth projecting radially inwardly and slanted axially relative to the clamp body. The at least one spike strip has a second longitudinal edge supported in a radial direction and in an axial direction on the clamp body. An area between the at least one spike strip and the radially inner side of the clamp body defined by the acute angle is free of parts counteracting a bending of the at least one spike strip toward the radially inner side of the clamp body.

22 Claims, 1 Drawing Sheet

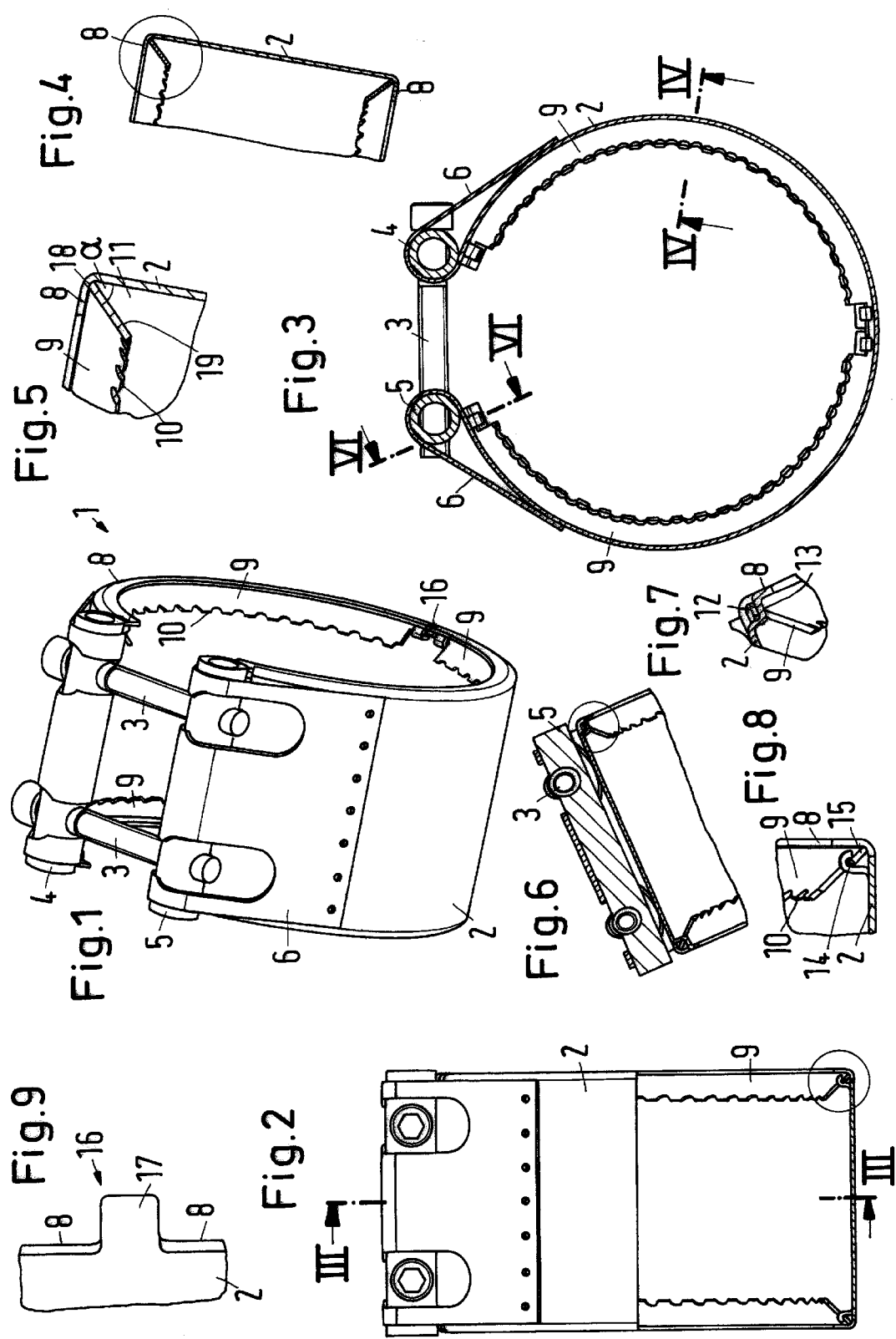

PIPE CLAMP, IN PARTICULAR, PIPE COUPLING

BACKGROUND OF THE INVENTION

1. Field of the Invention

The invention relates to a pipe clamp, in particular, a pipe coupling, comprising a tightenable clamp body with at least one spike strip arranged radially inwardly within the clamp body and slanted toward the axial center of the clamp body. The spike strip delimits an acute angle between it and the radially inner side of the clamp body and has teeth at one longitudinal edge which teeth project radially inwardly and are slanted axially relative to the clamp body. It is supported in the area of the other longitudinal edge in the radial direction and in the axial direction on the clamp body.

2. Description of the Related Art

Such a clamp serves either for coaxially connecting smooth end sections of pipes and/or as a holding clamp in connection with an additional support or fastening part for attachment on building parts.

When the pipe clamp is used as a pipe coupling, it has at its two axial ends a spike strip arrangement, respectively, wherein each spike strip arrangement is comprised of two or more spike strips. The teeth of the spike strips at the axial ends of the clamp body are facing one another. This has the effect upon tightening the clamp body that the pipe ends cannot easily be pulled apart again.

However, mounting of such a pipe clamp is relatively complex. Tightening of the clamp body must be realized with relatively high precision. Generally, this requires the use of a torque wrench.

SUMMARY OF THE INVENTION

It is an object of the present invention to simplify mounting of such a pipe clamp.

In accordance with the present invention, this is achieved in that the acute angle is free of means counteracting a bending of the spike strip toward the radially inner side of the clamp body.

In other words, the spike strip rests only with one longitudinal edge on the clamp body and projects otherwise freely to the center axis of the clamp body. On the backside of the spike strip delimiting the acute angle between the spike strip and the clamp body there is no element which could act as an abutment for the spike strip. When the clamp body is tightened, the teeth of the spike strip can be pushed radially outwardly. Since the spike strip is elastically yielding in a certain way, this results in a certain spring action. The teeth and the pipe ends accordingly are engaged with increasing grip the tighter the clamp body is tightened. Moreover, the slanted teeth ensure that the two pipe ends with increasing tightening of the clamp body and the resulting diameter reduction of the clamp body are moved toward one another and can approach one another with a certain predetermined force. At the same time, an adaptation to different diameters of the two pipe ends is possible. The spike strip at the pipe end with the greater diameter is adjusted more with regard to its contact angle. Since the spike strip is without abutment on its backside, it can be unimpededly pushed or bent radially outwardly. This increases at most the contact force of the teeth on the pipe but does not result in overloading of support means of any kind.

Preferably, the spike strip rests on the clamp body in the area of the other longitudinal edge, wherein the clamp body and the spike strip have matching contact shapes which receive pressure forces in the axial and radial directions. In this way, across the greater part of the circumference of the clamp body there is no permanent attachment required between the clamp body and the spike strip. It is sufficient when on the clamp body and/or on the spike strip shaped portions are provided which support one another such that the spike strip can be moved in an axial direction relative to the clamp body. A movement in the radial direction (relative to an annular clamp body, respectively), is not possible anyway because such a radial movement is prevented by the clamp body.

It is particularly preferred in this context that the clamp body has a radially inwardly bent edge portion which forms an inner angle in which the other longitudinal edge of the spike strip is arranged. Accordingly, the clamp body is bent at its axial ends so that the clamp body, in cross-section, has a U-shaped profile or a C-shape profile open radially inwardly. When the spike strip is now positioned into the corner of the profile, wherein the spike strip together with the clamp body delimits an angle in the range of 15° to 75°, the edge portion provides a sufficient support relative to a movement of the spike strip relative to the clamp body in the axially outward direction. The clamp body itself provides a sufficient abutment relative to a movement radially outwardly. When the tension in the clamp body increases because the clamp body is positioned somewhat tighter about the pipe, the spike strip cannot yield or move away but can only elastically yield in the direction toward the clamp body wherein possibly the angle between the spike strip and the clamp body changes; otherwise, no change in the geometry can be observed.

Preferably, the spike strip is connected with its ends to the clamp body. This embodiment is particularly advantageous when in the circumferential direction of the pipe clamp two or more spike strips are provided. When the spike strip is a ring, optionally also in the form of a ring which is interrupted once, it is sufficient in many cases to simply place the ring into the clamp body. When, on the other hand, several ring sections are provided, the attachment of the ends of the spike strip prevents that the spike strip can be lost. Moreover, the fixation of the spike strip on the clamp body achieves that the clamping forces can be generated with sufficient precision where they are supposed to act.

Preferably, the spike strip is positive-lockingly connected with the clamp body. A positive-locking connection can be produced in a simple way. It requires no complex additional measures such as welding, soldering or gluing. It is only required to shape certain areas of the clamp body and/or of the spike strip so that the corresponding connecting geometry can be produced. The positive-locking connection is limited to the ends of the spike strip.

In this connection it is particularly preferred that the clamp body and the spike strip are connected to one another by hoops which are formed as a unitary part of the clamp body and positive-lockingly connected with the spike strip, or formed as a unitary part of the spike strip and positive-lockingly connected with the clamp body, or positive-lockingly connected with the spike strip and the clamp body. Such a configuration can be produced relatively simply. It is sufficient to stamp certain parts and to bend them. This can be carried out during the stamping and bending processes which are required anyway for producing the pipe clamp.

Preferably, on each one of the spike strips a hoop is connected on at least two sides of the hoop with the clamp body and forms a pocket into which the spike strip can be inserted. Such a configuration of the hoop increases the stability and strength of the connection of the hoop with the correlated part of the clamp body or the spike strip. For attachment of the spike strip on the clamp body, a movement of the spike strip relative to the clamp body is required. However, this can be realized in most situations.

In this connection, it is advantageous when the hoop is fastened with one end while it can be bent open at the end. In this way, the bending process upon attachment of the spike strip on the clamp body is limited to the hoop so that neither the clamp body nor the spike strip must be deformed.

Preferably, one end of the hoop is fastened on the edge portion. In this way, the hoop can begin already at a certain radial spacing from the clamp body, i.e., in certain situations one or the other bending process can be omitted. In particular when the hoop is fastened with both ends on the clamp body, no extension of the hoop itself is required.

Preferably, the spike strip has at least at one end a fastening portion which is rotated relative to the remainder of the spike strip. As already mentioned, the spike strip and the clamp body together delimit an acute angle. This angle would also be provided at the fastening portion so that a corresponding great radial extension of the hoop would be required. When instead the fastening portion is rotated somewhat relative to the remainder of the spike strip, the radial length of the hoop can be reduced.

In this connection, it is particularly preferred that the fastening portion is arranged at least approximately parallel to the clamp body. The hoop can then have its minimal radial length. At the same time, when the fastening portion is forced approximately in a planar way against the clamp body, an improved holding of the spike strip on the clamp body is provided.

Preferably, the edge portion in the circumferential direction has at least one interruption. In this way, a hinge can be formed on the clamp body. This facilitates on the one hand the manufacture of the pipe clamp because with a folded-open clamp body a better access to the interior of the clamp body is possible. This is advantageous particularly when positioning the spike strips. On the other hand, mounting or demounting of the pipe clamp by a worker is facilitated because the worker is able to bend the clamp body open, for example, in order to place the clamp about the pipe or pipe ends or to remove it therefrom.

Preferably, the interruption is formed in that the edge portion is bent axially outwardly about a predetermined circumferential length. In this way, it is prevented during tightening that the force lines which form within the clamp body are interrupted. This improves the loading strength of the pipe clamp.

It is also advantageous when the interruption in the circumferential direction is arranged outside of a spike strip. In this way, the function of the hinge is not impaired by a spike strip. Mounting of the spike strip in the clamp body is simplified.

Also, it can be provided that the circumferential length of the clamp body is selected such that its circumferential ends rests against one another when the clamp is tightened to such an extent that the diameter of the circle described by the free tooth ends is smaller than the smallest nominal outer diameter, taking into consideration the pipe diameter tolerance range of the pipe or pipes to be received in the clamp.

In this way, overloading of the parts is prevented so that the clamp body can thus be tightened up to the point of contact of its ends (clamping jaws). Mounting can therefore be monitored visually without requiring measuring instruments of any kind. This means also that a torque wrench is not required. Still, the spike strip remains flexibly prestressed.

The invention will be explained in the following with the aid of a preferred embodiment in connection with the drawing.

BRIEF DESCRIPTION OF THE DRAWING

In the drawing:

FIG. 1 is a perspective illustration of a pipe clamp which is formed as a pipe coupling;

FIG. 2 is a side view, partially in vertical section;

FIG. 3 is a section III—III according to FIG. 2;

FIG. 4 is a section IV—IV according to FIG. 3;

FIG. 5 shows an enlarged view of a detail of FIG. 4;

FIG. 6 is a section VI—VI according to FIG. 3;

FIG. 7 shows an enlarged view of a detail of FIG. 6;

FIG. 8 shows an enlarged view of a detail of FIG. 2; and

FIG. 9 is a plan view onto an interruption of an edge portion.

DESCRIPTION OF THE PREFERRED EMBODIMENTS

FIG. 1 shows a pipe clamp 1 formed as a pipe coupling which is used for connecting smooth, i.e., free of profilings, end portions of two pipes (not illustrated). The pipe clamp 1 has a tightenable clamp body 2 which is substantially bent to a ring shape. The two ends of the clamp body 2 are tightened with the aid of clamping screws 3 wherein the ends of the clamp body 2 are moved toward one another when the clamping screws 3 are tightened so that the inner diameter of the area which is surrounded by the clamp body 2 is reduced. The clamping screws 3 are guided through a joint sleeve 4 and connected to the joint sleeve 5 by screwing. The joint sleeves 4, 5 are arranged in loops 6 which are formed by bending end portions of the clamp body 2 and connected by thermal fusing, for example, projection welding or spot welding, with the main part of the clamp body and provide the clamping jaws of the pipe clamp together with the sleeves 4, 5 or pivot bolts.

The clamp body 2 has at its two axial ends edge portions 8 which are bent radially inwardly. This can be seen in particular in FIGS. 4 and 5. The clamp body 2 forms thus in section a U-shaped or C-shaped profile that opens radially inwardly. Into the angles which are formed between the clamp body 2 and an edge portion 8, respectively, a spike strip 9 is inserted. The spike strip 9 has teeth 10 which, relative to the clamp body 2, are oriented radially inwardly. The spike strip 9 is bent such that the teeth 10 also project axially inwardly.

On each axial end of the clamp body 2 two spike strips 9 are arranged, as can be seen in particular in FIG. 3. The spike strips 9 are free of any support about their entire length, i.e., between the ends of each spike strip 9 over the entire length the situation as illustrated in FIG. 5 is present: no support means or elements are arranged within an angle area 11 with an angle a in the range of 15° to 75° between the clamp body 2 and the spike strip 9. The backside 19 of the spike strip 9 is free of any support or abutment. The spike strip 9 can thus be bent with elastic deformation radially against the clamp body 2. A resistance in this connection is produced mainly by the spike strip 9 itself which, for a corresponding force loading upon tightening of the pipe clamp, must be deformed so that the teeth 10 can move farther radially outwardly. For this reason, it is theoretically possible to produce the spike strip 9 on each axial end of the clamp body 2 as a unitary part and to position it simply in the angle area 11 between the main portion of the clamp body 2 and the edge portion 8. For practical reasons, it is however advantageous to provide the spike strip 9 in a multi-part configuration and to connect its end positive-lockingly with the clamp body 2. Such a positive-locking connection is illustrated in FIGS. 7 and 8.

The spike strip 9 has therefore a fastening section 12 which, relative to the remainder of the spike strip 9, is rotated such that the fastening section 12 is approximately parallel to the clamp body 2.

The clamp body 2 as a hoop 13 which is formed in that the clamp body 2, in the circumferential direction before and behind the hoop 13, has two cuts which extend in the axial direction. The area between the two cuts (not illustrated in detail) then forms the hoop 13 which is pushed radially inwardly in order to obtain the shape illustrated in FIG. 7. It can be seen that the hoop 13 is attached on the clamp body 2 as well as on the edge portion 8. The connection between the clamp body 2 or the edge portion 8 and the hoop 13 is of a monolithic configuration at both ends of the hoop 13. Between the hoop 13 and the clamp body 2 there is thus a pocket provided into which the fastening portion 12 of the spike strip 9 can be inserted. The hoop 13 can also be connected on three sides with the clamp body 2 and optionally the edge portion 8 so that the pocket for insertion of the spike strip 9 is open only at one side.

The other end of the spike strip 9 is fastened in a similar way. A hoop 14 is bent out of the clamp body 2 and generated by a U-shaped cut in the clamp body 2. The resulting tab can then be bent substantially perpendicularly relative to the clamp body radially inwardly and at the end radially outwardly in a U-shape so that the other end portion 15 of the spike strip 9 can be enclosed by the hoop 14. This provides a positive-locking connection between the clamp body 2 and the spike strip 9 which requires no additional fastening parts or fastening methods. Of course, the fastening portion 15 can also be bent or connected relative to the remainder of the spike strip 9. The different illustration in FIGS. 7 and 8 has been selected in order to demonstrate both possibilities.

As is shown in FIG. 1, the edge portion 8 has an interruption 16 on each circumferential end. This interruption 16 is illustrated on an enlarged scale in FIG. 9. It can be seen that the edge portion 8 is bent outwardly and forms a surface 17 which is substantially positioned in the same plane as the clamp body 2. This configuration has the advantage that the force flow in the circumferential direction is not interrupted to such a great extent as in the case of a simple radial cut in the edge portion 8. The interruption 16 provides a kind of hinge where the clamp body 2, after releasing the clamping screws 3, can be bent open. This bending-open action facilitates the manufacture of the pipe clamp 1, in particular, the insertion or introduction of the spike strips 9. The fastening portions 12 in the area of the hinge sleeves 4, 5 are inserted when the clamp body is in the open position. Subsequently, the hoops 14 at the other end are bent about the end portions 15 and the spike strips 9 are fixed reliably in the clamp body 2.

Also, when the pipe clamp 1 is mounted on a pipe or removed from a pipe, it can be advantageous for the worker when the pipe clamp 1 can be bent open in order to place it about the pipe or to remove it from the pipe.

The function of the pipe clamp can be described as follows:

When the pipe clamp 1 has been placed about a pipe or about two pipe ends, the clamping screws 3 are tightened. In doing so, the inner diameter of the space surrounded by the clamp body 2 is reduced. The teeth 10 then first contact and later on engage the circumferential surface of the pipe or pipe section. When the tightening screws 3 are tightened farther, and the pipe clamp 1 is thus tightened even more, the teeth 10 can move or yield radially outwardly. This requires that they also perform a corresponding movement in the axially inward direction because the spike strips 9 in a way must be tilted about the corner point of the angle area 11, so that, particularly in the case of loading of pipe ends, the pipes are forced to a greater extent toward one another. Since the spike strips 9, aside from the contact of the longitudinal edge 18 which is not provided with teeth 10, and the attachment of the end portions 12, 15 are not supported in the radial direction, the teeth 10 can be moved freely outwardly. In this way, the pressing force onto the pipe is increased. However, other parts cannot be overloaded. In particular, it is not required to pay attention to applying a predetermined torque for tightening the pipe clamp 1. The pipe clamp can be tightened, essentially with visual checking, and the tension can be controlled in that attention is paid to whether the two loops 6 of the clamping jaws with the joint sleeves 4, 5 are positioned at a certain spacing from one another or, for a correspondingly longer clamp body, the pipe clamp is tightened so that the ends abut one another. Preferably, the circumferential length of the clamp body 2 is selected such that its circumferential ends are contacting one another when the pipe clamp is tightened to such an extent that the diameter of the circle described by the free tooth ends is smaller than the minimal nominal outer diameter of the pipe or pipes to be received in the clamp, taking into account the pipe diameter tolerance range in this connection.

If at the inner side of the spike strips 9, i.e., between the slanted backside of the spike strips 9, facing the inner side of the clamp body 2, and the clamp body 2, a support were present, for example, in the form of a rubber sleeve or a projection bent out of the clamp body 2 or the like, then the radially outward movement of the teeth would be impeded, which is to be prevented with the present invention.

The attachment of the spike strips 9 on the clamp body 2 can also be provided in a different way, for example, in that on the spike strip 9 corresponding hoops are formed which engage cutouts or openings or bores on the clamp strip 2. It is also possible to provide hoops which are formed as separate parts and engage about the spike strip and corresponding shaped portions on the clamp body 2.

Moreover, it is not an absolute requirement that the clamp body 2 is provided with the edge portions 8 when the securing action of the spike strips 9 on the clamp body 2 can be achieved in a different way. One possibility would be to provide or form on the spike strip 9 radially extending projections which engage corresponding cutouts in the clamp body 2.

While specific embodiments of the invention have been shown and described in detail to illustrate the inventive principles, it will be understood that the invention may be embodied otherwise without departing from such principles.

What is claimed is:

1. A pipe clamp comprising:
   a tightenable clamp body;
   at least one spike strip arranged radially inwardly within the clamp body and slanted toward an axial center of the clamp body, wherein the at least one spike strip and a radially inner side of the clamp body delimit an acute angle therebetween;

wherein the at least one spike strip has a first longitudinal edge provided with teeth projecting radially inwardly and slanted axially relative to the clamp body;

wherein the at least one spike strip has a second longitudinal edge supported in a radial direction and in an axial direction on the clamp body, wherein the at least one spike strip is directly positive-lockingly connected with the clamp body; and wherein an area between the at least one spike strip and the radially inner side of the clamp body defined by the acute angle is free of means counteracting a bending of the at least one spike strip toward the radially inner side of the clamp body.

2. The pipe clamp according to claim 1, wherein the second longitudinal edge of the at least one spike strip rests against the clamp body, wherein the clamp body and the at least one spike strip have matching contact shapes which receive pressure forces in the axial and radial directions.

3. The pipe clamp according to claim 2, wherein the clamp body has a radially inwardly bent edge portion forming an inner angle area, wherein the second longitudinal edge of the spike strip is arranged in the inner angle area.

4. The pipe clamp according to claim 3, wherein the at least one spike strip has ends directly connected to the clamp body.

5. The pipe clamp according to claim 3, wherein the edge portion in the circumferential direction has at least one interruption.

6. The pipe clamp according to claim 5, wherein the interruption is formed in that the edge portion is bent outwardly about a predetermined circumferential length.

7. The pipe clamp according to claim 6, wherein the interruption in the circumferential direction is arranged outside of the spike strip.

8. The pipe clamp according to claim 1, further comprising hoops connecting the clamp body and the at least one spike strip to one another, wherein the hoops are formed integrally with the clamp body and are positive-lockingly connected to the at least one spike strip.

9. The pipe clamp according to claim 8, wherein one of the hoops on the at least one spike strip is connected at least on two sides of the hoop with the clamp body and forms a pocket, wherein the at least one spike strip is inserted into the pocket.

10. The pipe clamp according to claim 9, wherein one end of the hoop is fastened on the edge portion.

11. The pipe clamp according to claim 8, wherein one of the hoops has one attached end and one bendable end configured to be bent into an open position.

12. The pipe clamp according to claim 1, further comprising hoops connecting the clamp body and the at least one spike strip to one another, wherein the hoops are formed integrally with the at least one spike strip and are positive-lockingly connected to the clamp body.

13. The pipe clamp according to claim 12, wherein one of the hoops on the at least one spike strip is connected at least on two sides of the hoop with the clamp body and forms a pocket, wherein the at least one spike strip is inserted into the pocket.

14. The pipe clamp according to claim 13, wherein one end of the hoop is fastened on the edge portion.

15. The pipe clamp according to claim 12, wherein one of the hoops has one attached end and one bendable end configured to be bent into an open position.

16. The clamp body according to claim 1, further comprising hoops connecting the clamp body and the at least one spike strip to one another, wherein the hoops are connected positive-lockingly with the at least one spike strip and the clamp body.

17. The pipe clamp according to claim 16, wherein one of the hoops on the at least one spike strip is connected at least on two sides of the hoop with the clamp body and forms a pocket, wherein the at least one spike strip is inserted into the pocket.

18. The pipe clamp according to claim 17, wherein one end of the hoop is fastened on the edge portion.

19. The pipe clamp according to claim 16, wherein one of the hoops has one attached end and one bendable end configured to be bent into an open position.

20. The pipe clamp according to claim 1, wherein the at least one spike strip has at least at one end provided with a fastening portion rotated relative to the remainder of the at least one spike strip.

21. The pipe clamp according to claim 20, wherein the fastening portion is arranged at least substantially parallel to the clamp body.

22. The pipe clamp according to claim 1, wherein the clamp body has a circumferential length and opposed circumferential ends, wherein the circumferential length is selected such that the opposed circumferential ends of the clamp body rest against one another when the pipe clamp is tightened to such an extent around a pipe or pipes to be connected that the diameter of a circle described by free tooth ends of the teeth is smaller than a smallest nominal outer diameter of the pipe or pipes to be received in the pipe clamp, when taking into consideration a pipe diameter tolerance range.

* * * * *